(12) United States Patent
Penland et al.

(10) Patent No.: US 12,258,032 B2
(45) Date of Patent: Mar. 25, 2025

(54) SYSTEM AND METHOD FOR CARGO LOAD HEIGHT OBSERVATION

(71) Applicant: Cottrell, Inc., Gainesville, GA (US)

(72) Inventors: Patrick Penland, Gainesville, GA (US); Gerard Biagi, Gainesville, GA (US)

(73) Assignee: Cottrell, Inc., Gainesville, GA (US)

( * ) Notice: Subject to any disclaimer, the term of this patent is extended or adjusted under 35 U.S.C. 154(b) by 237 days.

(21) Appl. No.: 17/962,029

(22) Filed: Oct. 7, 2022

(65) Prior Publication Data
US 2023/0105738 A1 Apr. 6, 2023

Related U.S. Application Data

(60) Provisional application No. 63/253,005, filed on Oct. 6, 2021.

(51) Int. Cl.
| | | |
|---|---|---|
| *B60W 50/14* | (2020.01) | |
| *B60P 3/07* | (2006.01) | |
| *B60W 40/12* | (2012.01) | |
| *B60P 3/08* | (2006.01) | |

(52) U.S. Cl.
CPC .............. *B60W 50/14* (2013.01); *B60P 3/07* (2013.01); *B60W 40/12* (2013.01); *B60P 3/08* (2013.01); *B60W 2050/143* (2013.01); *B60W 2050/146* (2013.01); *B60Y 2400/3015* (2013.01); *B60Y 2400/408* (2013.01)

(58) Field of Classification Search
CPC ................ B60W 50/14; B60W 40/12; B60W 2050/143; B60W 2050/146; B60P 3/07; B60P 3/08; B60Y 2400/3015; B60Y 2400/408
See application file for complete search history.

(56) References Cited

U.S. PATENT DOCUMENTS

| | | | | |
|---|---|---|---|---|
| 2,834,002 A * | 5/1958 | Nordsiek | ............... | B60Q 9/003 200/61.42 |
| 3,720,916 A * | 3/1973 | Edgar | .................... | B60Q 9/003 340/436 |
| 3,769,931 A * | 11/1973 | Babut | ................. | B60R 16/0232 116/28 R |
| 5,374,918 A * | 12/1994 | Tharbs | ..................... | B60Q 1/52 340/440 |
| 5,389,912 A * | 2/1995 | Arvin | .................... | G01S 15/931 340/436 |
| 6,177,868 B1 * | 1/2001 | Hollingsworth | ......... | B60Q 9/00 180/41 |
| 7,876,202 B2 * | 1/2011 | Liljeblad | .............. | B62D 35/001 296/180.2 |
| 10,843,694 B2 * | 11/2020 | Schmidt | ................ | B60W 30/09 |

(Continued)

*Primary Examiner* — Steven Lim
*Assistant Examiner* — Son M Tang
(74) *Attorney, Agent, or Firm* — Smith Tempel Blaha LLC; Matthew T. Hoots

(57) ABSTRACT

Exemplary embodiments of a system and method for cargo height observation are disclosed. Certain embodiments are configured such that a user, such as a tractor operator, may verify that an overall height of the car hauler, as may be dictated by the height positions of one or more vehicles positioned on ramps associated with an upper deck of the car hauler, is below a predetermined allowable height for the car hauler when being transported over public or private roadways.

14 Claims, 9 Drawing Sheets

(56) References Cited

U.S. PATENT DOCUMENTS

| | | | |
|---|---|---|---|
| 2004/0075847 A1* | 4/2004 | McCracken | G01B 11/02 |
| | | | 356/622 |
| 2014/0104423 A1* | 4/2014 | Choi | G06V 20/58 |
| | | | 348/148 |
| 2018/0037412 A1* | 2/2018 | Lynch | B65G 1/00 |
| 2020/0070877 A1* | 3/2020 | Lutz | B60W 10/20 |
| 2020/0081121 A1* | 3/2020 | Singhal | G01S 17/86 |
| 2020/0156630 A1* | 5/2020 | Schmidt | B60W 30/0956 |
| 2020/0339399 A1* | 10/2020 | Liu | B25J 19/023 |
| 2021/0302580 A1* | 9/2021 | Mian | G08B 21/182 |
| 2023/0105738 A1* | 4/2023 | Penland | B60W 40/12 |
| | | | 340/438 |

\* cited by examiner

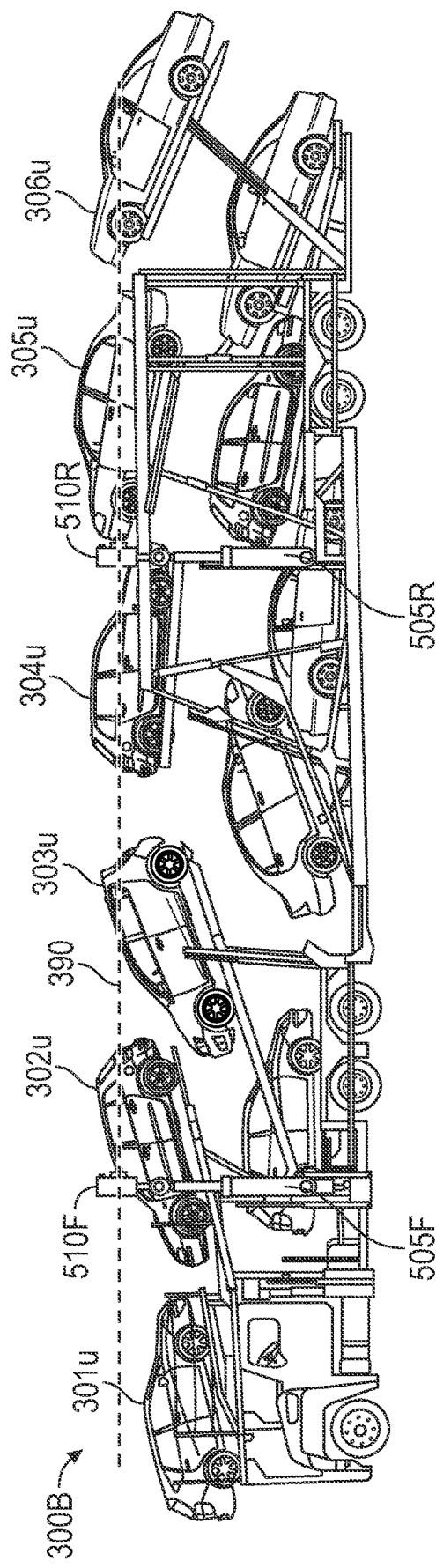
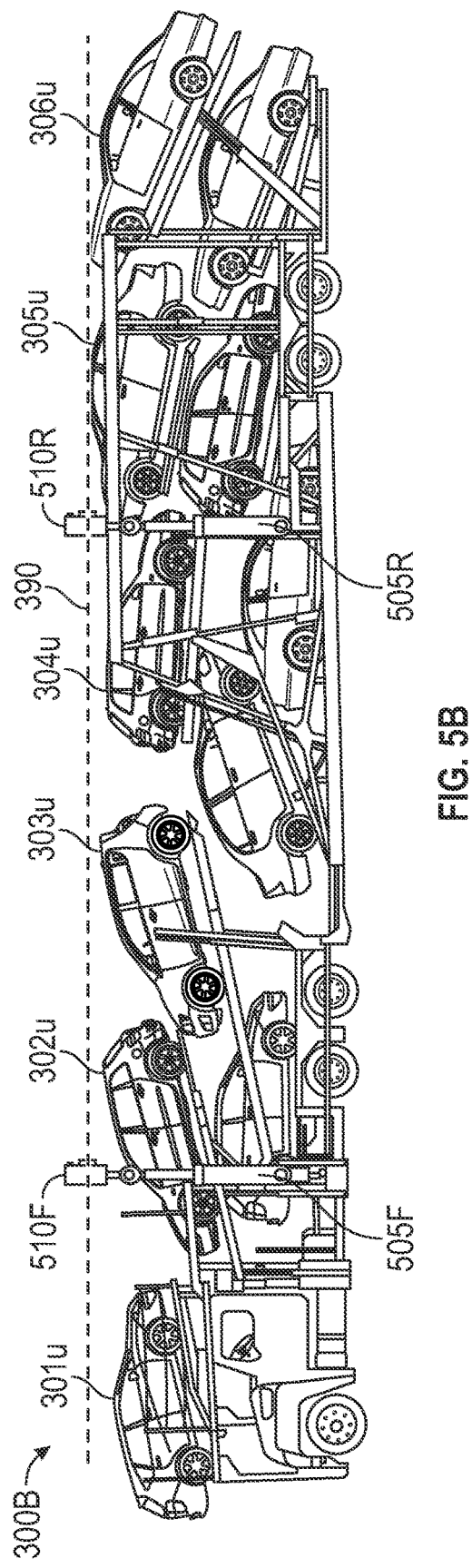
FIG. 5A
FIG. 5B

SYSTEM AND METHOD FOR CARGO LOAD HEIGHT OBSERVATION

CROSS-REFERENCE TO RELATED APPLICATION

This claims priority under 35 U.S.C. § 119(e) to U.S. provisional application entitled "SYSTEM AND METHOD FOR CARGO LOAD HEIGHT OBSERVATION," filed on Oct. 6, 2021 and assigned application Ser. No. 63/253,005, the entire contents of which are hereby incorporated by reference.

BACKGROUND

The present invention relates to systems and methods related to car haulers and, more particularly, to a system and method for observing when a vehicle positioned on an upper deck ramp of a car hauler is positioned too high for on-road use of the car hauler.

In this description, the term "car hauler" means a car carrier trailer or car carrier vehicle whether such equipment is integral to a tractor (i.e., a "car carrier vehicle") or hitched to a tractor (i.e., a "car carrier trailer") such as by a fifth wheel coupling. A car hauler, in addition to the tractor itself, is generally comprised of a "head ramp" or "head rack" section associated with the tractor and a trailer section (see FIG. 2 illustration, example), although all car haulers do not necessarily include a head ramp section (see FIG. 1, for example). Other terms with which "car hauler" may be interchangeably used in the industry are car-carrying trailer or auto transport trailer. Generally, therefore, and as would be understood by those of skill in the art, a car hauler is a type of trailer or semi-trailer or vehicle designed and configured for transport a payload comprised of vehicles, although use of car haulers within the scope of this disclosure are not limited to hauling vehicles-applications of embodiments of the solution may be applicable to car haulers and/or other open-bodied trailer systems employed for hauling any given type of payload.

With the above definition of a "car hauler" in mind, one of ordinary skill in the art will understand and acknowledge that a "car hauler" may be in the configuration of a truck only (see FIG. 1), or in the configuration of a trailer only (see FIG. 2), or in the configuration of a truck and trailer combination (see FIG. 3) and, as such, the use of the term "car hauler" throughout this description is for ease of reading and will not be construed to suggest that embodiments of the solution are limited to only one particular configuration of car haulers known in the industry or, for that matter, limited to any particular payload type for which a given car hauler may be employed. Moreover, use of the term "vehicle" in this description is meant to be an exemplary payload type (i.e., a payload of "vehicles") for car haulers equipped with an embodiment of the present solution and will not be construed to suggest that embodiments of the solution are only applicable to car haulers with a payload comprised of vehicles—the term "vehicle," therefore, as used in this description will be understood to envision any type of payload that may be carried over a roadway, public or private, by a given car hauler. And so, even though for ease of reading and explanation the present description and attached figures refer to payloads comprised of "vehicles," it will be understood that embodiments of the solution may be applicable to any one or more configurations of car haulers without regard to the makeup of the payload itself (and/or truck haulers and/or motorcycle haulers and/or equipment haulers and/or haulers of anything that must have an overall height below a given threshold for lawfully hauling a payload on public or private roadways).

Car haulers may be of an open or closed body design; however, it is envisioned that embodiments of the present solution are applicable to open body styled car haulers operable to raise vehicles positioned onto the upper deck ramps above a predetermined clearance height for roadways. Open body car haulers typically employ a double-decker design, with each deck defining a number of loading and storage ramps that can be tilted and lifted independently of one another with hydraulics. By manipulating the heights and tilts of the loading and storage ramps, vehicles may be loaded and unloaded from the various decks/ramps of a car hauler.

Typically, vehicles are loaded and/or unloaded from a car hauler via their own power—that is, the payload vehicles are literally driven onto, and off of, a car hauler. To load vehicles onto the top deck of a double-decker car hauler, for example, the rear half of the upper deck may be tilted and lowered (using the aforementioned hydraulics) in order to form a drive-up ramp to the upper deck. A vehicle may then be driven up onto the upper deck of the car hauler. Vehicles may be systematically loaded onto the upper and lower decks (depending on the vehicle types, anticipated delivery schedule, etc.), however, typically the upper deck of a car hauler is loaded first and off-loaded last since the presence of vehicles on the lower deck may make it impractical for the upper deck ramps to be lowered sufficiently for offloading. When unloading the lower deck ramps, the upper deck ramps may be raised above a predetermined height that would be acceptable for on-road transport since one or more vehicles positioned on the upper deck ramp(s) may be over such acceptable predetermined height.

As would be understood by one of ordinary skill in the art, if any one or more of the vehicles positioned on the upper deck ramp(s) are inadvertently left at a height position that exceeds a predetermined acceptable clearance height for on-roadway use of the car hauler, catastrophic damage to the trailer and/or the payload vehicles may be incurred if a roadway obstacle (such as a bridge or over-road signage) is encountered. Therefore, the state of the art would benefit from a system and method that, in addition to other methods and best practices in the industry for determining car hauler load heights, will alert a car hauler operator when one or more vehicles on an upper deck ramp of a car hauler may be in a position above a predetermined acceptable height for on-road use of the car hauler, thereby discouraging the operator from driving down a roadway with an over height load.

SUMMARY

Exemplary embodiments of a system and method for cargo height observation are disclosed. Certain embodiments are configured such that a user, such as a tractor operator, may verify that an overall height of the car hauler, as may be dictated by the height positions of one or more vehicles positioned on ramps associated with an upper deck of the car hauler, is below a predetermined allowable height for the car hauler when being transported over public or private roadways.

A height observation system for car hauling according to the solution provides additional information to the car hauling operator to assist in determining if the predetermined height limit of the car hauler may have been exceeded. By federal and state regulation, car hauling vehicles may not be allowed to exceed a load height of 13' 6" (some states allow exceptions). One current industry method of observing load height is with a telescoping load height stick. Advantageously, certain embodiments of the solution provide an enhanced method of observing load height in conjunction with the load height stick.

Once a car hauler equipped with an embodiment of the solution has been loaded with vehicles and is in a stationary state (such as parked in a parking lot), the system may be configured such that the operator must initiate the load height observing operation or, in some embodiments, the load height observing operation may be automatically initiated when the hydraulics of the car hauler are turned off (or automatically initiated in response to some other trigger).

It is envisioned that the system may be configured such that it is interjected into the operator's routine such that it cannot be ignored during normal operation. Subsequently, actuators extend via input from a mobile controller and raise cameras and/or sensing devices (LIDAR, radar, TOF laser, sonar, IR, etc.) to a height that corresponds with the desired load height observation height. The outputs from the cameras and/or sensing devices may be displayed to the operator in the truck cab, although alternative embodiments may incorporate a monitor/user display in locations other than the truck cab such as, for example, on a smart phone associated with the operator or on a display mounted outside the cab. Based on the displayed information, the operator can then either decide that (1) the observing operation is complete or (2) can stop the height observing operation, adjust the load height and then restart the load height observing operation. If the operator deems the load height observing process complete, the operator may initiate an input that tells the mobile controller that the height observing operation is complete and the actuators then retract which completes the load height observation operation. If additional load height adjustment is required, the operator can turn off the height observing operation, make load height adjustments and then restart the load height observing process. It is envisioned that in the event that an operator elects to adjust the load height, certain embodiments of the solution may automatically reengage thereby ensuring that the above steps are repeated.

An exemplary system for car hauler height observation comprises a first telescoping tube assembly mounted in association with a first section of a car hauler configured to transport a payload comprised of one or more vehicles. A first sensor is mounted in association with the first telescoping tube assembly such that extension and retraction of the telescoping tube assembly operates to adjust a position of the sensor. A user interface in communication with the first telescoping tube assembly and the first sensor, and a monitoring component in communication with the first sensor, work together to provide the operator with visual and/or audible feedback regarding the height of the vehicle cargo relative to the maximum allowed clearance height. To do so, the first telescoping tube assembly is extended such that the first sensor is aligned with a predetermined height. An output of the sensor is displayed on the monitor to provide indication of any one or more of the vehicles residing in the first section of the car hauler exceeding the predetermined height.

The exemplary system may further comprise a second telescoping tube assembly mounted in association with a second section of the car hauler. A second sensor is mounted in association with the second telescoping tube assembly such that extension and retraction of the telescoping tube assembly operates to adjust a position of the sensor. Like the first telescoping tube assembly and sensor combination, when the second telescoping tube assembly is extended such that the second sensor is aligned with a predetermined height, an output of the sensor displayed on the monitor provides indication of any one or more of the vehicles residing in the second section of the car hauler exceeding the predetermined height.

BRIEF DESCRIPTION OF THE DRAWINGS

In the Figures, like reference numerals refer to like parts throughout the various views unless otherwise indicated. For reference numerals with letter character designations such as "210R" or "210F", the letter character designations may differentiate two like or associated parts or elements present in the same Figure. Letter character designations for reference numerals may be omitted when it is intended that the reference numeral encompass all parts having the same reference numeral in all Figures.

FIG. 5A illustrates an exemplary embodiment of the solution leveraged to detect an "over-lift" state such as that shown in the FIG. 4A illustration;

FIG. 5B illustrates the exemplary embodiment of the solution demonstrated in FIG. 5A and leveraged to detect a "road-ready" state such as that shown in the FIG. 4B illustration;

DETAILED DESCRIPTION

Figure 1:
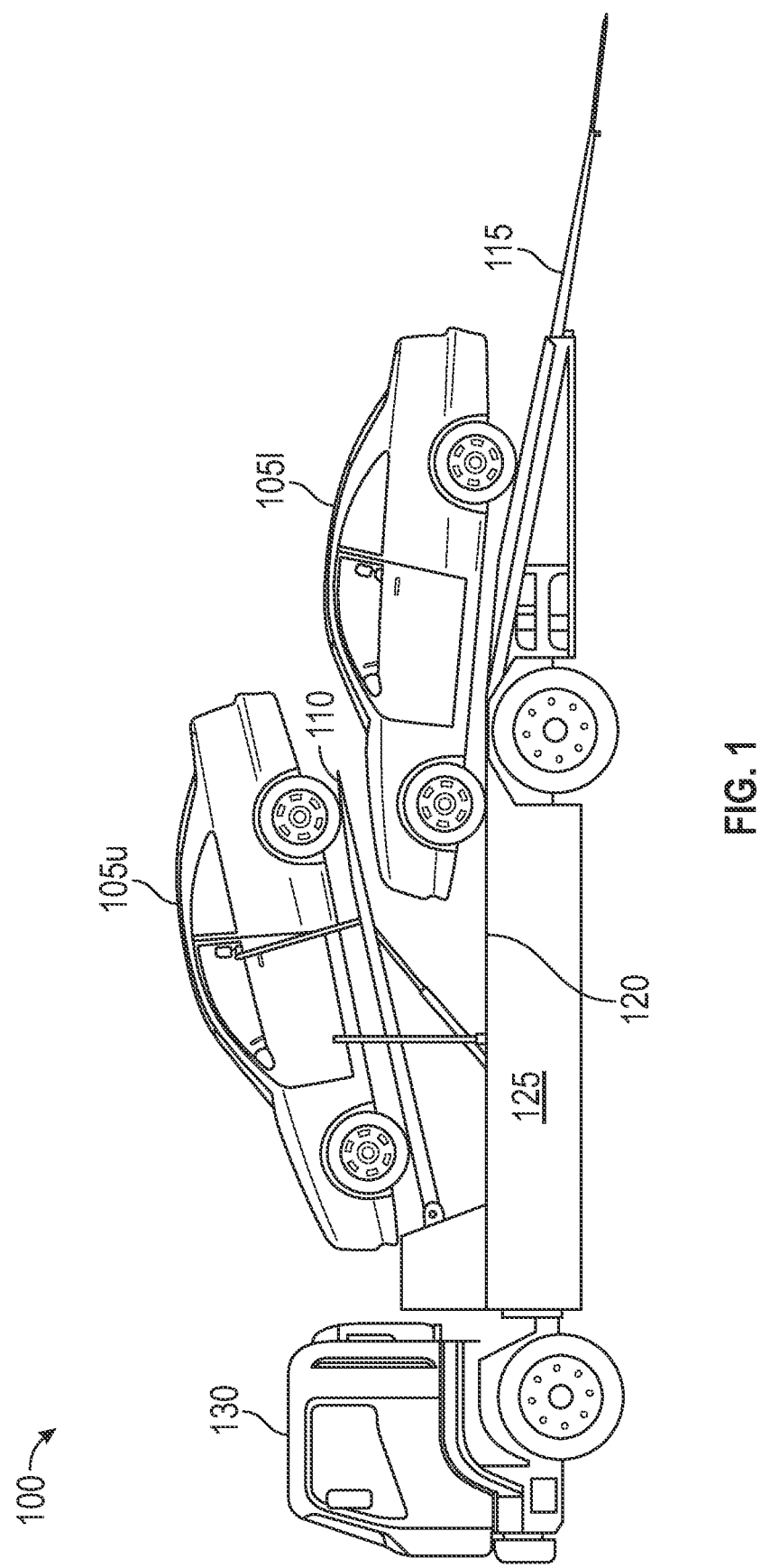
FIG. 1 illustrates an exemplary "truck only" car hauler to which certain embodiments of the solution may be applicable.

Various embodiments, aspects and features of the present invention encompass a system and method for height observation on a car hauler. Embodiments of the solution provide supplemental information to a tractor operator that enables the tractor operator to assist in determining if a predetermined maximum height limit for the car hauler has been exceeded. In this way, it is envisioned that embodiments of the solution, when properly calibrated and used by a tractor operator, may provide a redundant system and method for cargo load height observation on a car hauler in addition to the primary system and method of using a load height stick.

Notably, upper deck ramps of a car hauler may be raised in order to give access to vehicles that are being loaded onto, or off of, the lower deck ramps. As one of ordinary skill in the art would acknowledge, if vehicles positioned on the upper deck ramps are left at such raised heights, then the car hauler may exceed an acceptable height for transport on roadways.

A scenario that may create an over height condition for a car hauler is when the operator delivers a partial load to one delivery locale with the intention of subsequently delivering the remaining load to a different locale. To drop off a first partial load, the operator of a car hauler may be required to raise the upper decks of the car hauler in order to unload vehicles stored on the lower decks. Thereafter, if the upper decks of the car hauler remain at the raised positions, the car hauler may be in an "over-lift" state that constitutes an over height condition.

Particularly for car haulers comprising head ramps and trailer portions, simply looking at a loaded (or partially loaded) car hauler before heading out onto the road may not be sufficient to assist in determining if any one or more of the upper deck ramps are raised to a position that exceeds the predetermined maximum acceptable height for on-road use of the car hauler. Moreover, simply mounting a single camera or other sensor somewhere on the head ramp or trailer may not provide useful information if the car hauler is sitting on anything other than level ground, given that car haulers with trailers define an articulation point at the trailer hitch that, when the car hauler is on uneven ground, may allow for the trailer to be on a different plane than the head ramp associated with the tractor. To be clear, and as one of ordinary skill in the art of car haulers would acknowledge, the head ramp and trailer portions of a typical car hauler that has an articulating pivot are independent one from the other and, as such, if on uneven ground (such as a crest or a dip) a single camera or sensor mounted on either the head ramp or trailer may falsely assist in determining that a vehicle residing on a ramp at the opposite end of the car hauler is above the predetermined acceptable height (or, worse, falsely assist in determining that the ramps at the opposite end of the car hauler are beneath the predetermined maximum acceptable height when they are not).

Advantageously, embodiments of the solution may overcome these difficulties by leveraging at least a pair of strategically located sensors, one or more mounted in association with the head ramp and one or more mounted in association with the trailer. Depending on embodiment, it is envisioned that the sensors may be in the form of cameras, time of flight ("TOF") lasers, light detection and ranging scanners ("LIDAR") which are a type of TOF, infrared transmitters/receivers, etc. Illustrations of some of these exemplary embodiments can be seen in the figures that accompany the provisional application to which the present application claims priority. Of particular note in those provisional illustrations is a demarcation line overlaid on the camera image that has been previously calibrated to represent the pre-determined acceptable load height. Moreover, depending on embodiment, the user interface and feedback component presented to the user (tractor operator) may be in the form of a graphical user interface, a video, a picture, "go/no go" lights, "go/no go" audio feedback such as buzzers, etc. Illustrations of exemplary, non-limiting user interfaces are also envisioned in the figures that accompany the provisional application to which the present application claims priority.

Embodiments of the solution, regardless of the sensor technology and/or user interface technology leveraged, may include at least one telescoping tube assembly mounted in association with each of the head ramp and the trailer portions of a car hauler. Telescoping tube assemblies may be pneumatically, electrically, or hydraulically actuated, depending on embodiment.

Notably, although in the exemplary embodiments illustrated by the figures that follow there are depicted only a pair of telescoping tube assemblies (and sensors), embodiments of the solution are not limited to using just one or a pair of telescoping tube assemblies (and sensors) as it is envisioned that more than a pair may be used in some embodiments such as, for example, a left-side pair and a right-side pair or a forward and rear pair. The sensors may be fixed mounted to the telescoping tube assembly. The telescoping tube assembly may be configured to transition between a retracted state (for when the car hauler is being transported on-road) and an extended state (for when the system is being used to assist in determining if any vehicle residing on an upper deck ramp is in a position that causes the car hauler to exceed a predetermined maximum allowable height). Other embodiments may be configured such that the telescoping tube assemblies are operable to position the sensors mounted thereon at programmable heights and not necessarily at just a single upper height. Moreover, even for those embodiments of the solution that are configured such that the telescoping tube assembly is either retracted or extended to a predetermined height, the predetermined height may be selectable or otherwise programmable.

FIG. 1 illustrates an exemplary "truck only" car hauler 100 to which certain embodiments of the solution may be applicable. The car hauler 100 includes a truck/tractor 130 with an integrated bed 125. The bed 125 includes a pair of ramps: loading ramp 115 and storage ramp 110. As one of ordinary skill in the art of car haulers would understand, the ramps 110, 115 may be hydraulically (or mechanically or electromechanically) actuated between various states. In the illustration, it can be seen that storage ramp 110 has been hydraulically actuated to a raised state and that loading ramp 115 has been actuated to an extended state.

For the upper and lower vehicle payloads 105U, 105L to have been loaded onto car hauler 100 as depicted in the illustration, upper vehicle 105U would have been loaded first. To load upper vehicle 105U, an operator would have positioned storage ramp 110 in a lowered state that juxtaposed it to the surface 120 of the bed 125 while positioning the loading ramp 115 in the extended state depicted in the illustration. Subsequently, the upper vehicle 105U may have been driven up onto loading ramp 115 and then onto storage ramp 110. With the upper vehicle 105U positioned on storage ramp 110, the operator may have hydraulically actuated the storage ramp 110 to a raised position (such as that which is demonstrated in the illustration). With the storage ramp 110 in the raised position, the lower vehicle 105L may have been driven up onto loading ramp 115 and then parked on surface 120 of the bed 125. With the car hauler 100 having received its full payload of upper vehicle 105U and lower vehicle 105L as described above, the operator may adjust, if necessary, the raised state of storage ramp 110 such that it is lowered just above the hood/roof of lower vehicle 105L and, further, may hydraulically retract loading ramp 115.

Advantageously, with loading ramp 115 in a retracted state, and storage ramp 110 lowered to a position just above lower vehicle 105L, the car hauler 100 may be "road-ready" for transport of the payload. To ensure that the car hauler 100 is, indeed, road-ready after its payload has been loaded, positioned and secured, an operator must verify that the upper most surface of upper vehicle 105U is beneath a predetermined acceptable clearance height for on-roadway use. Embodiments of the solution, as will be disclosed in more detail in the subsequent figures and related description, and when used in redundancy with traditional load height stick verification procedures, provide a means by which an operator may determine if the upper vehicle 105U is, in fact, beneath the predetermined acceptable clearance height for on-roadway use.

Figure 2:
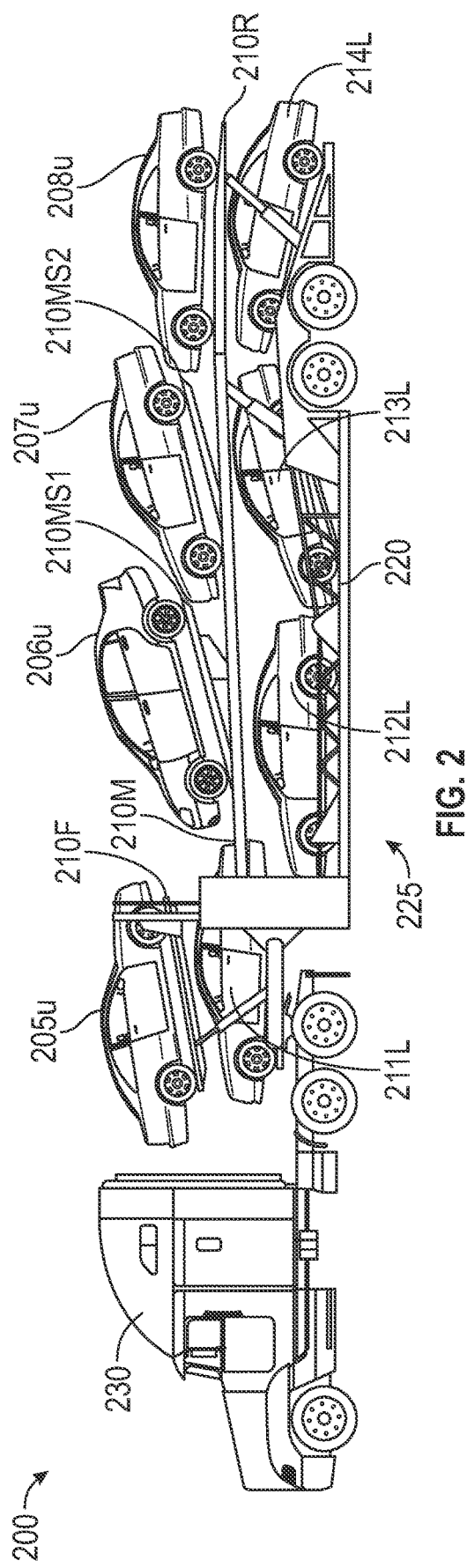
FIG. 2 illustrates an exemplary "trailer only" open-framed car hauler to which certain embodiments of the solution may be applicable.

FIG. 2 illustrates an exemplary "trailer only" open-framed car hauler 200 to which certain embodiments of the solution may be applicable. The car hauler 200 includes a truck/tractor 230 with a fifth wheel trailer 225, as would be understood by one of ordinary skill in the art. The fifth wheel trailer 225 includes a lower bed surface 220 and a series of ramps: rear ramp 210R, middle ramp 210M, and forward ramp 210F. As one of ordinary skill in the art of car haulers would understand, the ramps 210 may be hydraulically actuated between various positional states and, depending on the positional state, function as a loading ramp or a storage ramp. In the illustration, it can be seen that the various ramps 210 have been loaded and hydraulically actuated to positions associated with storage states.

To load the payload of vehicles onto car hauler 200, one of ordinary skill in the art would understand that the various ramps 210 on the upper portion of the fifth wheel trailer 225 would have been lowered into positional states associated with loading. Vehicle 205U would have been driven up onto ramp 210F via lowered ramps 210R and 210M (with 210R having been lowered to a position with its rearmost edge juxtaposed to a lower loading ramp that is in turn juxtaposed to the ground). Once vehicle 205U was loaded and secured on ramp 210F, the ramp 210F may have been hydraulically (or mechanically or electromechanically) raised to the storage state depicted in the FIG. 2 illustration. Subsequently, vehicles 206U and 207U may have been driven up onto middle ramp 210M and raised to the positions depicted in the FIG. 2 illustration via actuation of storage ramps 210MS1 and 210MS2, respectively (storage ramps 210MS1 and 210MS2 being associated with middle ramp 210M). Middle ramp 210 may then have been raised to the storage state depicted in the FIG. 2 illustration. With storage ramps 210MS1 and 210MS2 raised, vehicle 208U may have been loaded and secured to rear ramp 210R before ramps 210M and 210R were raised to the storage state depicted in the FIG. 2 illustration (which may be in an "over-lift" state).

With the upper portion of the payload (vehicles 205U, 206U, 207U, and 208U) loaded, secured and positioned as described above, the lower portion of the payload (vehicles 211L, 212L, 213L, and 214L) may be driven up onto the lower bed surface 220 of fifth wheel trailer 225 and secured. Once the lower portion of the payload is secured, the operator may, if necessary or desired, further lower ramps 210 such that each is lowered just above the hood/roof of a vehicle beneath.

Advantageously, with the various ramps 210 (as well as storage ramps 210MS1 and 210MS2) lowered, the car hauler 200 may be "road-ready" for transport of the payload. To ensure that the car hauler 200 is, indeed, road-ready after its payload has been loaded, positioned and secured, an operator must verify that the upper most surface of upper vehicles 205U, 206U, 207U, and 208U are beneath a predetermined acceptable clearance height for on-roadway use. Embodiments of the solution, as will be disclosed in more detail in the subsequent figures and related description, and when used in redundancy with traditional load height stick verification procedures, provide a means by which an operator may determine if the vehicles 205U, 206U, 207U, and 208U are, in fact, beneath the predetermined acceptable clearance height for on-roadway use.

Figure 3A:
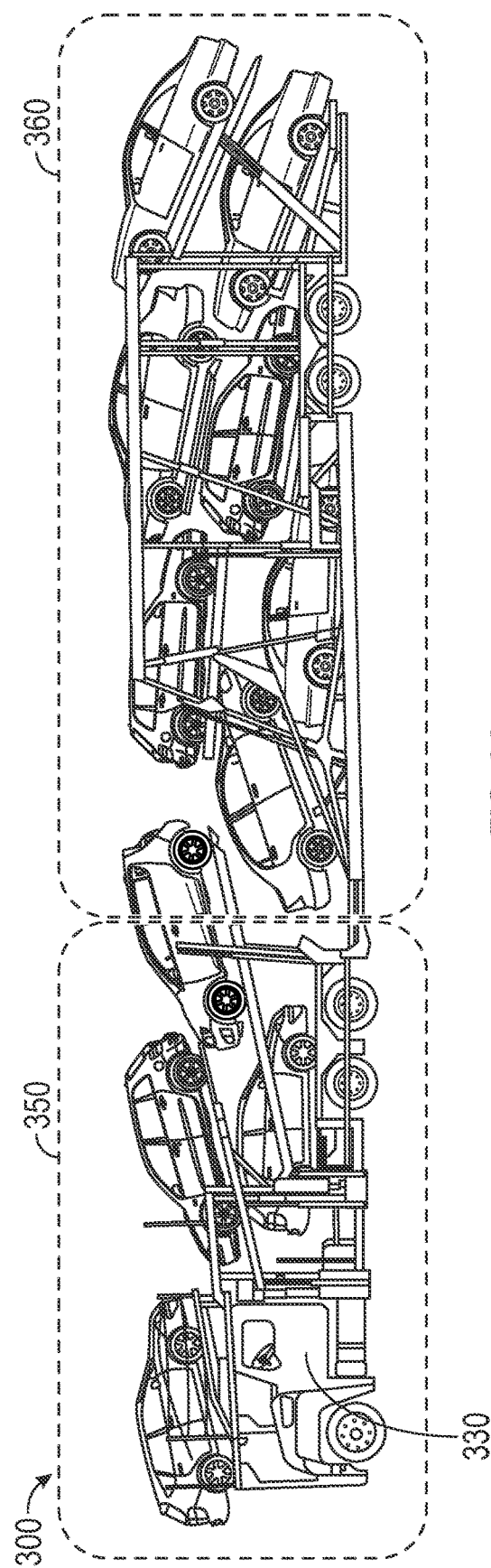
FIGS. 3A and 3B illustrate an exemplary open framed car hauler hitched to a tractor, the car hauler comprised of a "head ramp" section associated with the tractor and connected in an articulating arrangement with a trailer section.
Figure 3B:
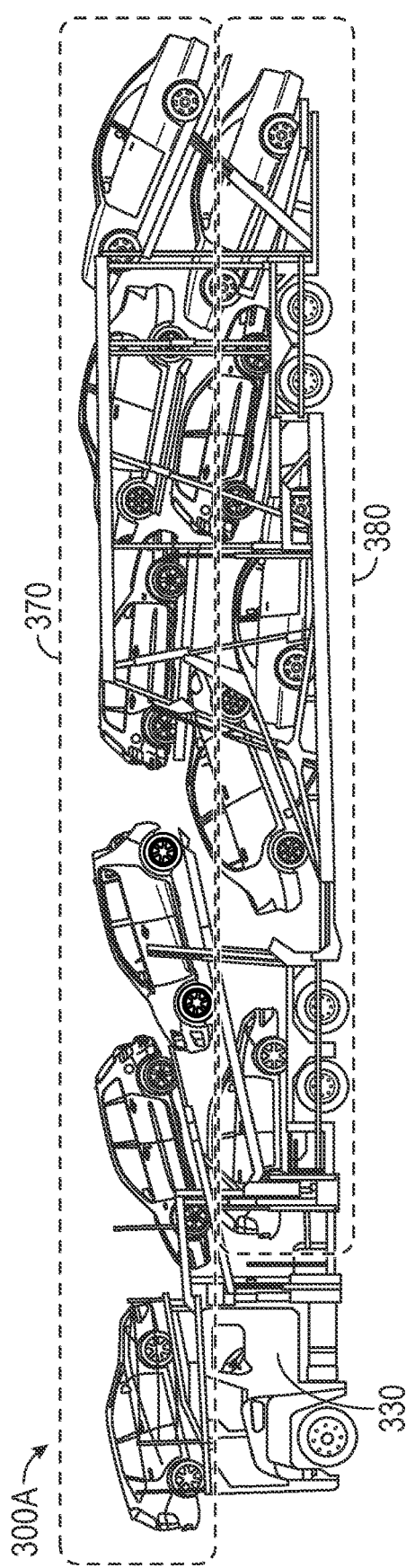

FIGS. 3A and 3B illustrate an exemplary open framed car hauler 300A hitched to a tractor 330, the car hauler 300A comprised of a "head ramp" section 350 associated with the tractor 330 and connected in an articulating arrangement with a trailer section 360. Similar to the exemplary "trailer only" open-framed car hauler 200 illustrated in FIG. 2, the car hauler 300A defines a system of upper deck ramps 370 and a system of lower deck ramps 380. Both the system of upper deck ramps 370 and the system of lower deck ramps 380 span across and include portions associated with the head ramp section 350 and the trailer section 360.

Although embodiments of the solution may be leveraged in applications defined by "truck only" car haulers (such as exemplary car hauler 100 illustrated in FIG. 1) and/or "trailer only" open-framed car haulers (such as exemplary car hauler 200 illustrated in FIG. 2), the solution will be described in more detail hereafter within the context of an application associated with an open framed car hauler such as exemplary car hauler 300A. One of ordinary skill in the art reviewing this disclosure will be able to apply the solution effectively regardless of the particular type of car hauler to which it is being applied.

Figure 4A:
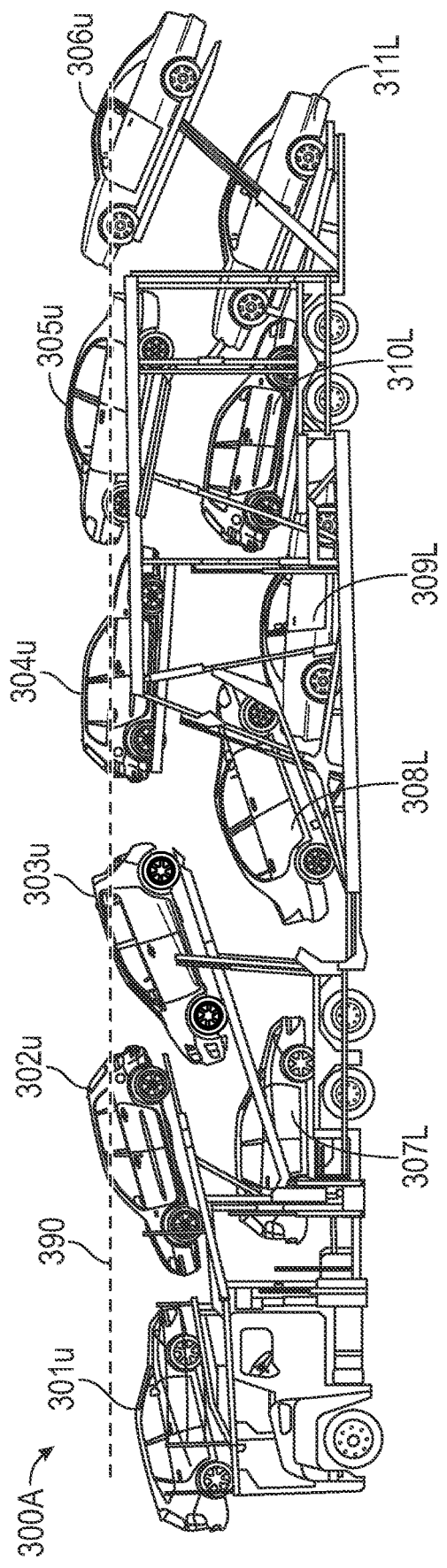
FIG. 4A illustrates the exemplary car hauler of FIG. 3 in an "over-lift" state such that certain of the upper decks of the car hauler remain at raised positions that constitute an over height condition.

FIG. 4A illustrates the exemplary car hauler 300A of FIG. 3 in an "over-lift" state such that certain of the upper ramps in the system of upper deck ramps 370 remain at raised positions that constitute an over height condition. The exemplary over-lift state illustrated in FIG. 4A may occur immediately after the payload has been loaded onto the car hauler 300A and secured. As can be understood from the FIG. 4A illustration, certain of the vehicles associated with ramps in the system of upper deck ramps 370 have surfaces that extend above a predetermined acceptable clearance height for on-roadway use, as illustrated by dashed line 390.

Similar to that which was described above relative to FIGS. 1 and 2, the various vehicles 301U, 302U, 303U, 304U, 305U, and 306U may have been loaded onto the various decks in the system of upper deck ramps 370 according to a systematic methodology that hydraulically (or mechanically or electromechanically) raises, lowers, and/or tilts the various ramps as the vehicles are transitioned from one deck ramp to the next. Once a vehicle is positioned on a desired deck or ramp, the vehicle may be secured, as one of ordinary skill in the art would understand. Once the various vehicles are loaded onto the upper deck ramps 370, vehicles 307L, 308L, 309L, 310L, and 311L may be sequentially loaded and secured onto the decks of the system of lower deck ramps 380.

At this point, to determine if the car hauler 300A is road-ready, an operator must verify that the upper most surface of upper vehicles 301U, 302U, 303U, 304U, 305U, and 306U are beneath predetermined acceptable clearance height 390 for on-roadway use. As can be seen from the FIG. 4A illustration, each of vehicles 302U, 303U, 304U, 305U, and 306U exceed height threshold 390.

Figure 4B:
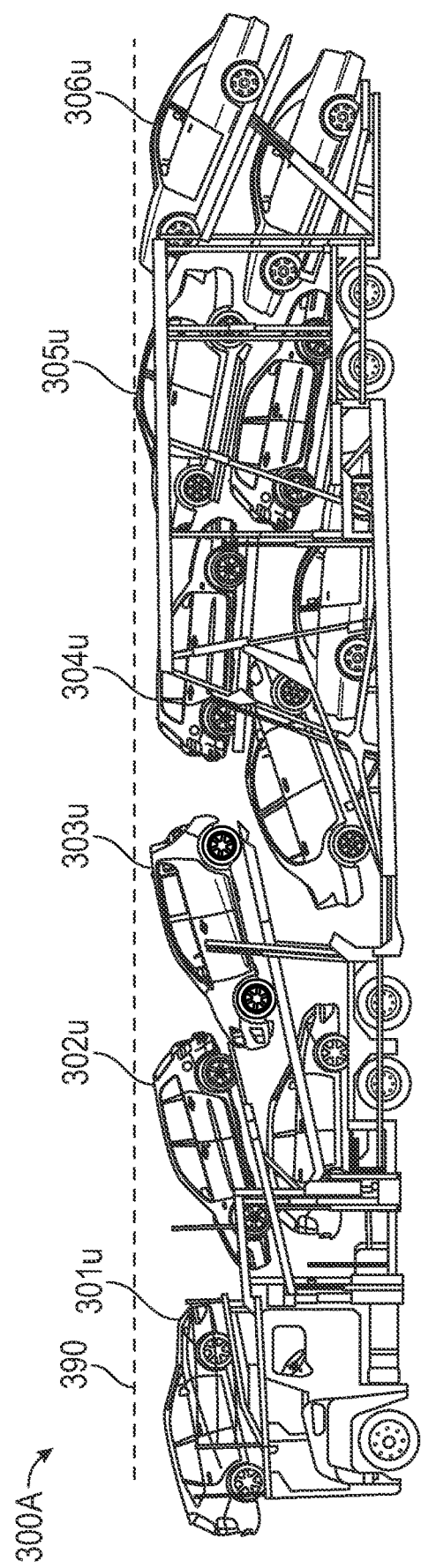
FIG. 4B illustrates the exemplary car hauler of FIG. 3 in a "road-ready" state such that the upper decks of the car hauler are at lowered positions that maintain the vehicle payload below a predetermined height clearance and ready for transport on a public roadway.

Turning now to FIG. 4B, illustrated is the exemplary car hauler 300A in a "road-ready" state such that the upper decks 370 of the car hauler 300A are at lowered positions that maintain the vehicles 301U, 302U, 303U, 304U, 305U, and 306U below the predetermined height clearance 390. To achieve the road-ready state, the operator may have systematically lowered the relevant upper deck ramps 370 associated with vehicles 301U, 302U, 303U, 304U, 305U, and 306U until each vehicle was completely beneath the predetermined height clearance 390. As is an understood and standard procedure in the industry, whether each of the vehicles 301U, 302U, 303U, 304U, 305U, and 306U is, in fact, beneath the predetermined height clearance 390 after the various decks of the system of upper decks 370 were lowered may have been determined by the operator visually using a height stick. Advantageously, when properly calibrated and leveraged by the operator, embodiments of the solution herein may provide a backup procedure and/or supplement procedure to the operator's use of a height stick in order to ensure that the car hauler is a road-ready state after a vehicle payload has been loaded and/or unloaded.

Turning now to FIG. 5A and the figures that follow it, it will be shown how embodiments of the solution, when used in redundancy with traditional load height stick verification procedures, may provide a means by which an operator may determine if upper vehicles are beneath the predetermined acceptable clearance height for on-roadway use. References may be made back to the illustration and description of the open framed car hauler 300A depicted in FIGS. 3A through 4B, however, as previously explained, it is envisioned that, and those of ordinary skill in the art will appreciate that, embodiments of the solution are not limited in application to just open framed car haulers.

FIG. 5A illustrates an exemplary embodiment of the solution leveraged to detect an "over-lift" state such as that shown in the FIG. 4A illustration. The exemplary car hauler 300B, unlike the exemplary car hauler 300A, has been outfitted with an embodiment of the solution for cargo height load observation and, as such, a pair of telescoping tube assemblies 505 with associated load height sensors 510 can be seen in the illustrations. A front telescoping tube assembly 505F and associated load height sensor 510F can be seen mounted within, and associated with, the head ramp section of the car hauler 300B. Similarly, a rear telescoping tube assembly 505R and associated load height sensor 510R can be seen mounted within, and associated with, the rear trailer section of the car hauler 300B.

Notably, although only two assemblies 505 with sensors 510 are depicted in the illustration, it is envisioned that embodiments of the solution may include any number of assemblies and sensor combinations, placed strategically around the car hauler as justified or called for by the given application for load height observation. Moreover, and referring briefly to the disclosure associated with the provisional filing to which the present disclosure claims priority, it is envisioned that embodiments of the solution leveraged on an open framed car hauler like the one illustrated in FIGS. 3A et seq may associate one or more telescoping tube and sensor combinations with each of the head ramp and the trailer section, considering that the articulation between the head ramp and the trailer section may, when exposed to something other than a level surface, preclude definition of a single predetermined acceptable clearance height that can be applied simultaneously to both the head ramp and the trailer section. For ease of illustration and explanation, however, the FIGS. 5A and 5B illustrations depict the car hauler 300B on a level surface such that the predetermined acceptable clearance heights monitored by the sensors 510F and 510R are one and the same.

Returning to the FIG. 5A illustration, the telescoping tube assemblies 505F, 505R, and their associated height sensors 510F, 510R, have been extended such that a plane monitored by the sensors 510F, 510R is representative of the predetermined acceptable clearance height 390 for on-roadway use of the car hauler. As such, with the various vehicles 302U, 303U, 304U, 305U, and 306U having surfaces that exceed the plane, the sensors 510F, 510R may be leveraged by the system to generate an indication or alert to the car hauler operator. In response, the operator may "double check" the overall height of the various vehicles using a height stick in order to determine which one or more of the vehicles are in an over-lift state. As previously explained, the operator may tilt and/or lower the various applicable upper decks to lower the vehicles until each is below the predetermined acceptable clearance height 390, as can be seen in the FIG. 5B illustration. As shown in the FIG. 5B illustration, the car hauler 300B is in a "road-ready" state as the various upper deck ramps have been adjusted such that each vehicle 302U, 303U, 304U, 305U, and 306U is beneath the predetermined acceptable clearance height 390 (before the car hauler 300B may actually be taken onto the road, the system may retract the tube assemblies 505 such that the sensors 510 are also beneath the height 390).

Figure 6:
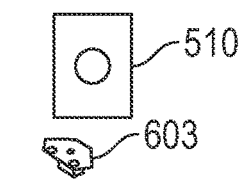
FIG. 6 illustrates an exploded view of an exemplary telescoping tube assembly that may be comprised in certain embodiments of the solution for extending and retracting a sensor.
Figure 6:
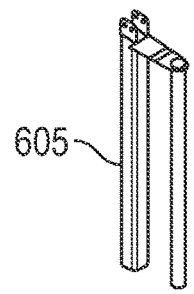
Figure 6:
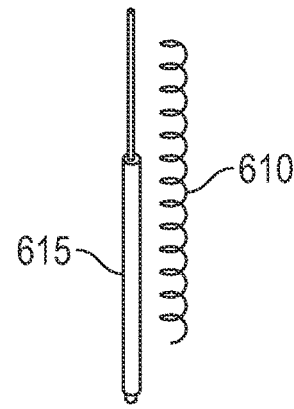
Figure 6:
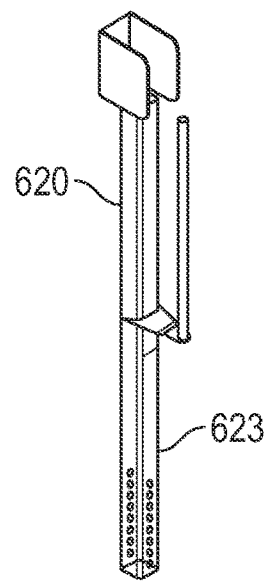
Figure 6:
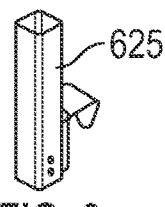

FIG. 6 illustrates an exploded view of an exemplary telescoping tube assembly 505 that may be comprised in certain embodiments of the solution for extending and retracting a sensor 510. The exemplary telescoping tube assembly 505 may be operable for a gross height adjustment via a post 623 that may be adjustably positioned within a base 625. In this way, the base 625 may be fixedly mounted to the car hauler at a strategic location such that the retracted overall height of the telescoping tube assembly 505 is dictated by the selectable positioning of the post 623 relative to the base 625. As can be understood from the FIG. 6 illustration, the gross height adjustment is accomplished via a pin through aligned holes in the post 623 and base 625.

An outer tube subassembly 620 comprises post 623 and is configured to slidably accept an inner tube subassembly 605. An actuator (pneumatic, electric, or hydraulic) 615 anchored at one end to the outer tube subassembly 620, and at a distal end to inner tube subassembly 605, is operable to extend and retract the inner tube subassembly 605 relative to the fixed and anchored position of the outer tube subassembly 620. That is, as the exemplary actuator 615 is actuated such that its rod is extended, so too is the inner tube subassembly 605 extended away from the outer tube subassembly 620. Conversely, as the exemplary actuator 615 is actuated such that its rod is retracted, so too is the inner tube subassembly 605 retracted back to an into the outer tube subassembly 620. In this way, because a sensor 510 may be mounted to the inner tube subassembly 605 via a sensor mounting assembly 603, actuation of the exemplary actuator 615 operates to either extend a sensor 510 toward a predetermined height clearance 390 or retract a sensor 510 to a point beneath the predetermined height clearance 390. A communications cable 610 connects the sensor 510 to a control unit.

Figure 7B:
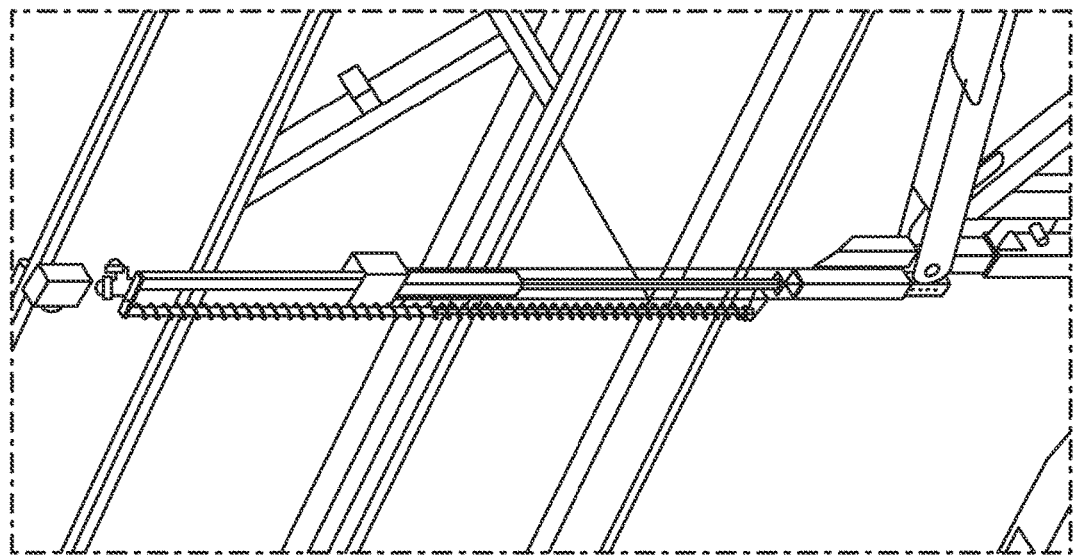
FIGS. 7A and 7B respectively illustrate the telescoping tube assembly/sensor assembly of the FIG. 6 illustration in both a retracted state and an extended state.
Figure 7A:
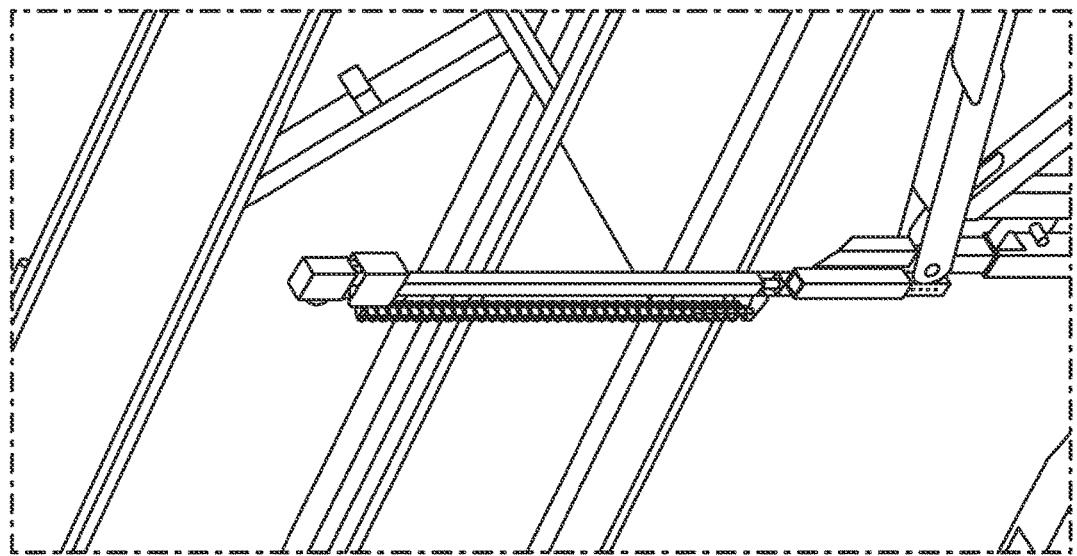

FIGS. 7A and 7B respectively illustrate the telescoping tube assembly 505/sensor 510 of the FIG. 6 illustration in both a retracted state and an extended state. As previously described, it is envisioned that any number of assemblies 505 with sensors 510 may be located on a given car hauler depending on the anticipated cargo. Some car haulers may require only a single telescoping tube assembly 505 with a sensor (such as, perhaps, a "truck only" car hauler 100) while other car haulers may require multiple tandems of assemblies 505 with sensors 510 in order to completely monitor a plane associated with a predetermined height clearance 390 (such as, perhaps, an open framed car hauler 300 with articulating trailer and head ramp). That is, multiple assemblies 505 with sensors 510 may be located in association with a head ramp and/or a trailer portion of a given car hauler.

As previously described, a telescoping tube assembly 505 may be placed in the retracted state when the car hauler is being transported over a roadway, so as to protect the assembly 505 and sensor 510 and to prevent an over height condition. Likewise, a telescoping tube assembly 505 may be placed in the extended state when a user is seeking to be aware if any one or more vehicles residing on the ramps of the upper deck of the car hauler are in a position that would cause an over height condition. Notably, it is envisioned that certain embodiments of the solution may leverage telescoping tube assemblies 505 that are configured to, either continuously or at predefined increments, raise until a vehicle residing on an upper deck ramp is no longer detected. In such embodiments, once the system recognizes that the telescoping tube assembly 505 has been extended to a point that the sensor no longer detects a vehicle, the actual height of the vehicle residing on the upper deck ramp may be calculated and compared to a predetermined maximum allowable height.

Figure 8:
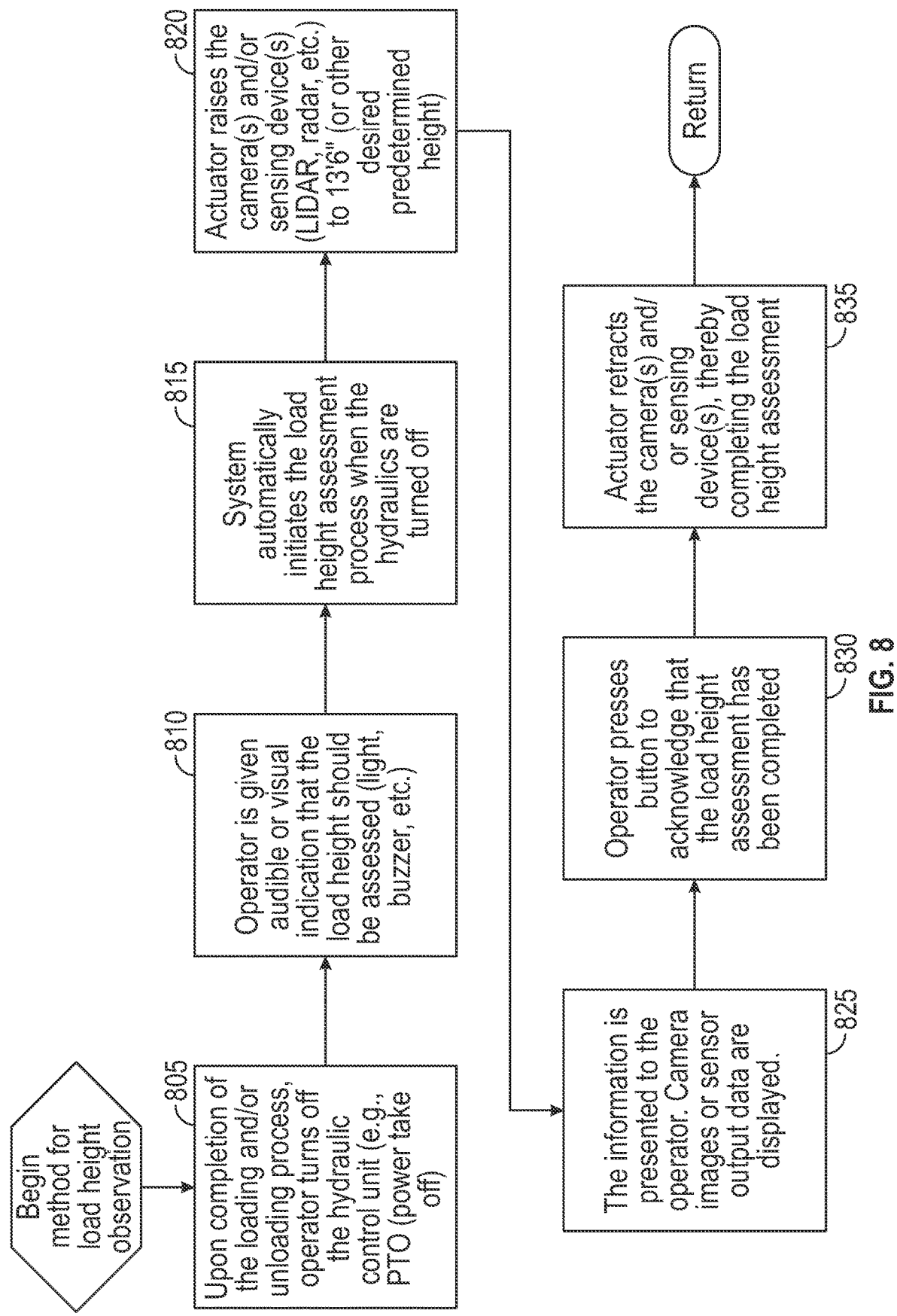
FIG. 8 illustrates an exemplary sequence of operation for an embodiment of the solution for car hauler height observation.

Turning now to FIG. 8, illustrated is an exemplary sequence of operation for an embodiment of the solution for car hauler height observation. Beginning at block 805, the operator (e.g., the tractor operator) turns off the hydraulic control unit (such as, for example, the PTO, i.e., the power take off). By turning off the hydraulic control unit, the state of the ramps of the car hauler may be considered stabilized. Next, at block 810, the system may provide the operator with audible or visual indication that the load height of the car hauler should be verified before taking the car hauler onto a public roadway or otherwise moving the car hauler from its current location. At block 815, the operator may respond by initiating the load height check. Next, at block 820, the system may raise the telescoping tube assemblies/sensors to a predetermined height associated with a maximum clearance height for the car hauler when being transported on a roadway. Relying on the feedback from the sensors at block 825, the operator may determine that one or more ramps of the upper deck of the car hauler may need to be lowered and, accordingly, does so and confirms using a load height stick. Once the indicators of the system show that the vehicles residing on the various ramps are at an acceptable height position, the system at block 830 may require the operator to provide an acknowledgement before allowing the operator to move the car hauler without further warnings. At block 835, the telescoping tube assemblies/sensor assemblies may be returned to a retracted state.

Notably, it is envisioned that different embodiments of the solution may provide the load height information in varying degrees of precision or detail-some may simply give an operator "go/no go" indications and trust that the operator will respond appropriately while other embodiments may go further to prevent the operator from proceeding until an acknowledgement from the operator is received that the ramp heights are acceptable; other embodiments may go as far as to prevent the operator from proceeding until the sensors ascertain that the pre-determined height has not been exceeded.

Figure 9:
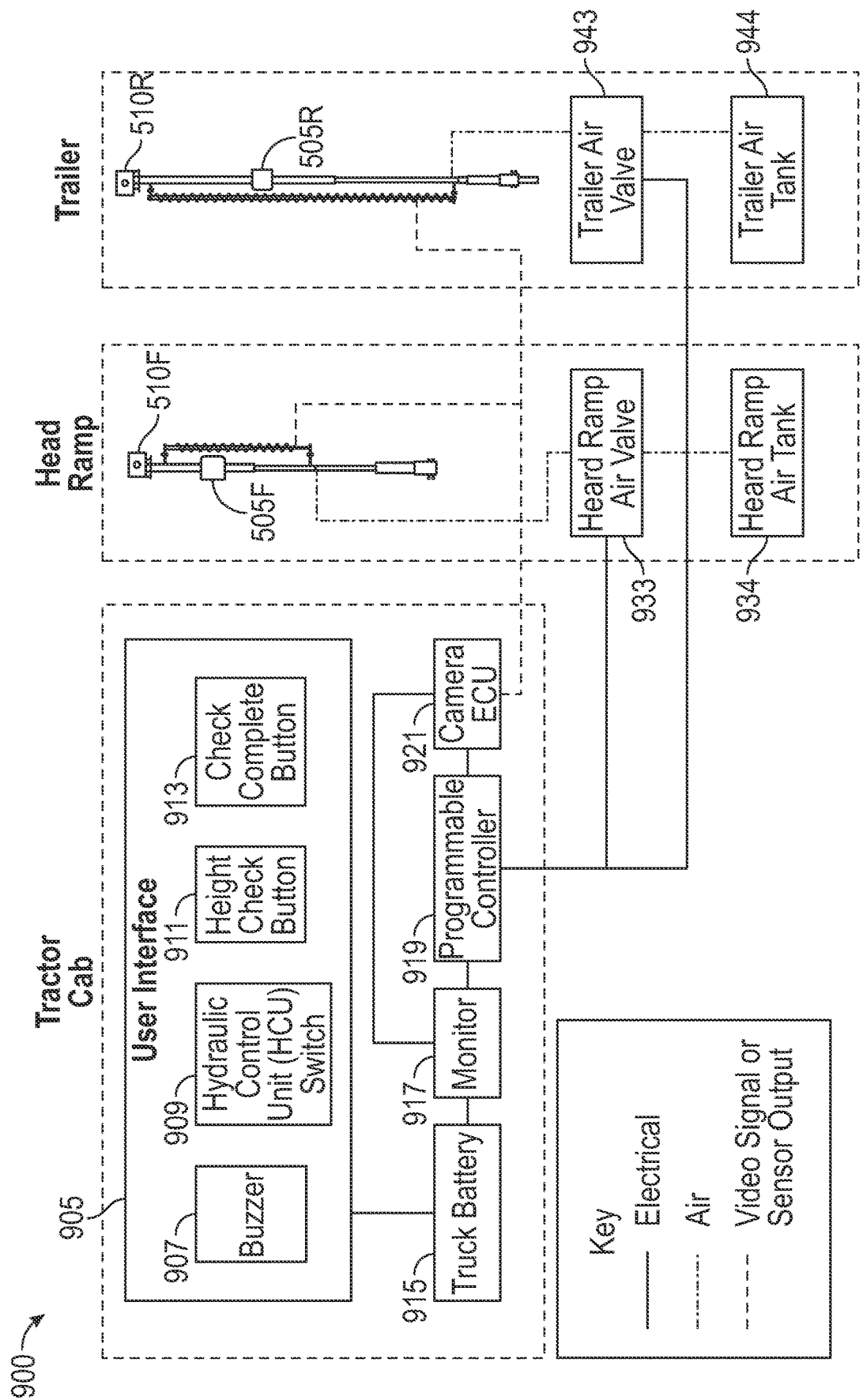
FIG. 9 is a simplified system diagram of an exemplary embodiment of the solution.

FIG. 9 is a simplified system diagram of an exemplary embodiment of the solution, adequate to inform one of ordinary skill in the art at least one way to enable the solution. As can be understood from the diagram of FIG. 9, a battery 915 comprised within the tractor of a car hauler may be used as a power source for the car hauler height observation system 900; however, it is envisioned that not all embodiments will necessarily rely on a battery of the tractor. Some embodiments may comprise dedicated batteries. In the exemplary diagram of FIG. 9, the sensor 510 technology is in the form of a camera. As previously described, however, it is envisioned that sensor 510 technology other than a camera may be leveraged by certain embodiments (such as, but not limited to, TOF, LIDAR, IR, etc.) of the solution and, as such, the scope of the solution is not limited to cameras as sensors.

Returning to the exemplary diagram, the camera ECU 921 is in video communication with the cameras 510 (sensors) mounted atop each of the head ramp and trailer telescoping tube assemblies 505. Air valves 933, 943 are also in pneumatic communication with each of the head ramp and trailer telescoping tube assemblies 505F, 505R, respectively. A programmable logic controller ("PLC") 919 or other controller type may be in electrical communication with the air valves 933, 943. A compressed air source 934, 944 is controlled by actuation of the air valves 933, 943, as would be understood by one of ordinary skill in the art. The camera ECU 921 works with the monitor 917 to display a video of the car hauler to the tractor operator, as previously described. A user interface may provide visual and/or audio feedback to the tractor operator including, but not limited to or requiring, a buzzer 907, an HCU switch 909, a height check button 911, and a check complete button 921.

Referring to the FIG. 9 diagram, an exemplary sequence of operation for an exemplary embodiment of a car hauler height observation system according to the solution may leverage the user interface that is presented to the tractor operator (i.e., user or operator) within the cab of the tractor and/or at some one or more locations exterior to the tractor cab. When the operator completes a task of loading and/or unloading vehicles onto the car hauler, safety protocol requires the operator to use a load height stick to physically check and confirm that the car hauler is not in an over-lift state. In addition to using the load height stick to verify that the car hauler is not in an over-lift state before the operator proceeds onto a roadway, the operator may consult the user interface and/or monitor 917 of the car hauler height observation system 900. Depending on embodiment, the user interface may include a buzzer 907 (or some other feedback or alarm feature such as, but not limited to any one or more of a light, a vibration, a beeping sound, etc.), a hydraulic control unit switch (HCU switch) 909, a height check button 911, check complete button 913 and a monitor.

Continuing with the exemplary sequence of operation, the operator may actuate the HCU switch 909 to turn off the hydraulic control unit (HCU). As would be understood by one of ordinary skill in the art, the HCU drives hydraulic pump(s) that enables movement of the car hauler decks. Notably, most car haulers include a safety interlock that prevents the car hauler from being moved until the HCU is turned off. Consequently, car hauler operators may be in the habit of turning off the HCU as a prerequisite to taking the car hauler onto a roadway. Advantageously, therefore, turning off the HCU may trigger the exemplary car hauler observation system to actuate the buzzer 907 in order to alert the operator to verify that the overall load height of the car hauler is not in an over-lift state.

Once the exemplary car hauler observation system has triggered the alert, the system may prevent release of the safety interlock or continue to sound a buzzer (or some other alert means) until the operator has completed the sequence of operation dictated by the car hauler observation system 900. A next step in the sequence may require the operator to actuate the height check button 911 on the user interface which, in turn, causes visual and/or audible feedback to be presented to the operator on a monitoring component 917 as generated by the sensors 510 after they have been positioned at a predetermined height via the telescoping tube assemblies 505. The monitoring component(s) 917 may be powered simultaneously with the sensors 510 and telescoping tube assembly actuators 505. If visual feedback, the presentation may be rendered on a display-type monitoring component 917 for the benefit of the operator and, if audible feedback, the presentation may be rendered in the form of verbal instructions through a speaker and/or in the form of "go/no-go" sounds. Regardless of the form of feedback, the system 900, having leveraged the various sensors 510 mounted to telescoping tube assemblies 505 on the car hauler, presents the operator with indications of any over-lift conditions, namely, any one or more instances of a vehicle exceeding a predetermined height associated with a road-ready state.

It is further envisioned that the monitoring component 917 may be leveraged to display views associated with each sensor 510 of the system 900, whether simultaneously or sequentially. If sequentially, the system 900 may allow the operator to toggle through the various views associated with the various sensors 510 in order to more easily locate the cause/area of any over-lift condition. Moreover, in some embodiments, the display component 917 may be configured to display a line or some other indicator on the screen simultaneously with the live visual display captured by the sensors 510 in order to represent a predetermined height above which would constitute an over-lift condition.

If an over-lift condition is indicated by the car hauler observation system 900, it is envisioned and encouraged that the operator should "double check" with a traditional load height stick and, if the over-lift condition is confirmed, take appropriate action to lower the necessary deck or decks to achieve a road-ready state. That is, if the operator determines that the load height does, indeed, require adjustment to prevent an over-lift condition, the operator may turn on the HCU and end the height assessing operation by retraction of the telescoping tube assemblies 505. The height of one or more decks may be adjusted according to operator judgment, followed by institution of a repeated height observation sequence to confirm success of the actions taken to adjust the load height to a road-ready state. Alternatively, if the operator is satisfied that the actions taken have cured any over-lift conditions and that the car hauler is safely in a road-ready state, the operator may indicate to the system that the height check procedure is complete by actuating the "check complete" button 913. Once a road-ready state is indicated by the operator, the system is triggered to release the safety interlock, retract the tube assemblies 505, and turn off the sensors 510 and monitor 917.

Systems and methods for a car hauler height observation have been described using detailed descriptions of embodiments thereof that are provided by way of example and are not intended to limit the scope of the disclosure. The described and illustrated embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons skilled in the art.

It will be appreciated by persons skilled in the art that a system or method for a car hauler height observation according to the solution is not limited by what has been particularly shown and described herein above. By way of example, and not limitation, while use of a load height stick in conjunction with use of an embodiment of the solution is highly recommended, advisable, and mandated, a load height stick (or its use) is not inherently captured in the scope of a claim or claims unless recited. Rather, the scope of the disclosed solution is defined by the claims themselves.

What is claimed is:

1. A system for height observation on a car hauler comprised of a head ramp and articulating trailer, the system comprising:
   a first telescoping tube assembly mounted in association with the head ramp of the car hauler, wherein the car hauler is configured to transport a payload comprised of one or more vehicles;
   a first sensor mounted in association with the first telescoping tube assembly, whereby extension and retraction of the first telescoping tube assembly operates to adjust a position of the first sensor;
   a second telescoping tube assembly mounted in association with the articulating trailer of the car hauler; and
   a second sensor mounted in association with the second telescoping tube assembly, whereby extension and retraction of the second telescoping tube assembly operates to adjust a position of the second sensor;
   a user interface in communication with the first telescoping tube assembly and the first sensor, and in communication with the second telescoping tube assembly and the second sensor; and
   a monitoring component in communication with the first sensor and the second sensor;
   wherein when the first telescoping tube assembly is extended such that the first sensor is aligned with a first predetermined height, an output of the sensor displayed on the monitor provides indication of any one or more of the vehicles residing in the head ramp of the car hauler exceeding the first predetermined height; and
   wherein when the second telescoping tube assembly is extended such that the second sensor is aligned with a second predetermined height, an output of the sensor displayed on the monitor provides indication of any one or more of the vehicles residing in the articulating trailer of the car hauler exceeding the second predetermined height; and
   wherein each of the first sensor and second sensor is one of a camera, a time of flight ("TOF") laser, a light detection and ranging scanner ("LIDAR"), and an infrared transmitter/receiver.

2. The system of claim 1, wherein each of the first and second telescoping tube assemblies is pneumatically actuated.

3. The system of claim 1, wherein the user interface comprises a hydraulic control unit switch.

4. The system of claim 1, wherein the system is powered from a battery associated with the car hauler.

5. The system of claim 1, wherein the system further comprises a programmable logic controller configured to dictate actuation of the first and second telescoping tube assemblies.

6. The system of claim 1, wherein the user interface comprises an audible alarm.

7. The system of claim 1, wherein the user interface comprises a height check function, actuation of which initiates a car hauler height observation sequence.

8. The system of claim 1, wherein the user interface comprises a check complete function, actuation of which ends a car hauler height observation sequence.

9. A method for height observation on a car hauler comprised of a head ramp and articulating trailer, the method comprising:
- mounting a first sensor in association with the head ramp of the car hauler and a second sensor in association with the articulating trailer of the car hauler, wherein the first and second sensors are operable to be positioned in alignment with a predetermined clearance height for a cargo of vehicles residing on the car hauler;
- for each of the first and second sensors, positioning the sensor in alignment with the predetermined clearance height;
- receiving signals from each of the first and second sensors and presenting a feedback to a user for each of the first and second sensors, wherein the feedback is based on the received signals;
- based on the feedback, determining if any one or more of the vehicles in the cargo exceed the predetermined clearance height; and
- if any one or more of the vehicles in the cargo exceed the predetermined clearance height, adjusting decks of the car hauler to lower the one or more vehicles; and
- wherein each of the first sensor and second sensor is one of a camera, a time of flight ("TOF") laser, a light detection and ranging scanner ("LIDAR"), and an infrared transmitter/receiver.

10. The method of claim 9, wherein presenting a feedback to a user comprises presenting a visual display.

11. The method of claim 9, wherein presenting a feedback to a user comprises presenting an audible sound.

12. The method of claim 9, wherein the method further comprises the user acknowledging completion of the method.

13. The method of claim 12, further comprising, for each of the first and second sensors, positioning the sensor beneath the predetermined clearance height after user acknowledgement.

14. The method of claim 9, further comprising turning off a hydraulic control unit.

* * * * *